United States Patent [19]

Garrison

[11] 4,423,718
[45] Jan. 3, 1984

[54] SOLAR COLLECTOR PANEL AND ENERGY SHIELD

[76] Inventor: John D. Garrison, 5607 Yerba Anita Dr., San Diego, Calif. 92115

[21] Appl. No.: 351,921

[22] Filed: Feb. 24, 1982

[51] Int. Cl.³ .............................................. F24V 3/02
[52] U.S. Cl. .................................. 126/438; 126/443; 126/448
[58] Field of Search ............... 126/438, 439, 448, 443

[56] References Cited

U.S. PATENT DOCUMENTS

| | | | |
|---|---|---|---|
| 4,198,955 | 4/1980 | Dorbeck | 126/438 |
| 4,325,359 | 4/1982 | Fries | 126/438 |

*Primary Examiner*—Carroll B. Dority, Jr.
*Attorney, Agent, or Firm*—John L. Haller

[57] ABSTRACT

A glass, evacuated, solar collector panel, formed by a mirrored bottom sheet, structured in a series of parallel linear troughs, each approximately an ideal concentrating surface and terminating at opposite ends in approximately perpendicular linear concentrating troughs, and a top window sheet. The top and bottom sheets being joined to provide a vacuum envelope. A solar selective absorbing tube network having an input and output passing through the vacuum envelope, fixed intermediate the top and bottom sheet in the vacuum. The tube network including a plurality of parallel longitudinal tube members terminating at opposite ends in respective manifold tubes. Each tube member and manifold tubes positioned at the approximate concentration point of such series of parallel troughs and opposite troughs, respectively. Such solar collector panel also serving as an energy shield by having low transmittance of heat and radiant energy of visible and infrared wavelengths.

22 Claims, 22 Drawing Figures

SOLAR COLLECTOR PANEL AND ENERGY SHIELD

BACKGROUND OF THE INVENTION

1. Field of the Invention

The invention described herein one of a class of collectors called solar thermal collectors, in which radiation from the sun is converted into heat at an absorbing surface, from which this heat is collected and utilized. Two particular important aspects of the invention are ideal concentration and high temperature selective absorbers. In combination with a high vacuum, utilization of these two features allow the development of a solar thermal collector which can operate efficiently at temperatures approaching 300 degrees C. without the expense of tracking the sun, that is, as a fixed collector.

2. Description of the Prior Art

Selective Absorption: A solar selective absorber for this purpose is defined as an absorber which has high absorptance for solar radiation and low absorptance, and thus low emittance, for infrared radation of wavelengths emitted at the operating temperature of the solar collector. Solar selective absorbers with optical properties similar to that required here are discussed, for example, by A. Meinel and M. Meinel, *Applied Solar Energy* (Addison-Wesley Publ. Co., Reading, Mass., 1976), Chap. 9. The optical properties of the selective absorber are extremely important in obtaining high efficiency for this type of collector.

Ideal Concentration: Ideal concentration provides maximum concentration for a given angle of acceptance of solar radiation. The kind of ideal concentration considered here is cylindrical concentration onto a circular absorbing tube. The concentrating mirror surface runs the length of the absorbing tube and forms a trough. The concentration ratio is defined as the ratio of the width of the concentrating trough at the top to the circumference of the absorbing tube.

A number of patents are concerned with ideal concentration. R. Winston, U.S. Pat. No. 4,002,499, is concerned with mirror reflector shapes for cylindrical or trough-like ideal concentration onto circular and oval cross section tubes and onto a vertical fin. A. Rabl and R. Winston, U.S. Pat. No. 4,130,107, also confine their discussion almost entirely to cylindrical concentrating mirror surfaces. In this case, they discuss a modification of Winston's patent which reduces the amount of grazing radiation on the absorbing surface, for radiation within certain pre-defined acceptance angles. W. Wyatt, U.S. Pat. No. 4,129,115, concerns himself with approximately ideal concentration suitable for a flat strip absorber, following an earlier patent of R. Winston, U.S. Pat. No. 3,923,381. He utilizes the desirable compromise of truncating the ideal concentration to reduce concentrating mirror area and thus cost. R. Lambert, U.S. Pat. No. 4,246,891, modifies the ideal concentration of Winston to be suitable for a circular cross section absorbing tube with concentric transparent vacuum enclosure.

With a circular cross section absorbing tube, ideal concentration leads to a cusp in the concentrating trough which is in contact with the bottom of the absorbing tube. In order to avoid heat conduction losses from the absorbing tube to the concentrating trough, a gap is introduced between the absorbing tube and the cusp. This leads to a loss of solar radiation, called gap loss. R. Winston and W. McIntire, separately, discuss a method of putting grooves below the absorbing tube to reduce gap loss, at the expense of reduced concentration. These discussions are in Proceedings of the 1980 Annual Meeting of the American Section of the International Solar Energy Society and the journal Solar Energy, Vol. 25, pp. 215-220 (1980). Grooves are less significant for the collector disclosed here, because the thickness of the lower glass sheet probably will not permit forming them easily, with sufficient accuracy to be helpful.

A solar collector using ideal or approximately ideal concentration with a sufficiently large acceptance angle can be oriented to receive solar radiation at all times of the year, during the daily desired hours of collection, without tracking the sun or in any way adjusting the orientation of the collector. This is an important method of greatly reducing the cost of a collector without appreciably reducing the collector performance.

Alternatively, the acceptance angle can be reduced to yield higher concentration, and the tilt of the collector can be adjusted a few times over the year to face the sun in each season. A rigidly fixed collector, using a selective absorber with superior optical properties, is preferred.

One patent where a collector design is indicated using approximately ideal concentration is that of A. Livermore, U.S. Pat. No. 4,134,392. He has discovered a cartesian curve describing his mirror concentrating surface which approximates the ideal concentration of Winston. He describes a solar collector involving an array of concentrating troughs with this cartesian curve shape, and with transparent tubes carrying an absorptive fluid placed in the bottom of these troughs to collect the solar energy as heat. Another case is that of D. Hervey, U.S. Pat. No. 3,321,012, who precedes Winston in the use of almost ideal concentration onto an elongated fin-like absorbing tube for the special case of a 180 degree acceptance angle. The early work of F. Trombe, in U.S. Pat. No. 3,310,102 concerning infrared radiators, includes two reflector shapes which consist of involutes joining smoothly to plane reflectors. These reflector shapes are very similar to Winston, above. Another early reflector of this type is the Trombe-Meinel cusp, discussed in Meinel and Meinel, above, p. 204. It involves ideal concentration onto a circular cross section tube for the special case of an acceptance angle of 180 degrees.

Vacuum Collectors Without Ideal Concentration: Numerous collector designs use glass vacuum envelopes to insulate the absorbing surface, but do not use ideal concentration or approximately ideal concentration. A few examples include Abbot, U.S. Pat. No. 1,801,710; Abbot, U.S. Pat. No. 1,855,815; Emmet, U.S. Pat. No. 1,880,938; Abbot, U.S. Pat. No. 2,133,649; Godel, et al, U.S. Pat. No. 3,227,153; Mather, U.S. Pat. No. 4,002,160; Pei, U.S. Pat. No. 4,084,576; and Doughty and Goodwin, U.S. Pat. No. 4,142,511.

Vacuum Collectors Using Approximately Ideal Concentration: The collector designs of L. Dorbeck, U.S. Pat. No. 4,198,955, use the features of vacuum, approximately ideal concentration, and selective absorption, which are required of a solar collector which is to be highly efficient at elevated temperatures, while still being low in cost. The tubular collectors described by Dorbeck are similar to those proposed by Garrison and Ortabasi and Buehl at about the same time in Proceedings of the 1977 Annual Meeting of the American Section of the International Solar Energy Society, and more recently reported in the journal Solar Energy, Vol. 23, pp. 93-102, 103-109 (1977), and Solar Energy, Vol. 24, pp. 477-489 (1980). The above group of designs, comprise those collectors closest in concept to the design of this application.

Other collectors using approximately ideal concentration, vacuum and selective absorption include: General Electric Company collectors TC 100 and TC 120 (following Lambert, above); and Energy Design Corporation, Memphis, Tenn., collector XE 300 (similar to the Argonne National Laboratory design described without vacuum by A. Rabl, et al in Solar Energy, Vol. 25, pp. 335-351 (1980)).

Prior Art Deficiencies: As discussed, numerous designs for solar energy collection systems have appeared over the years in patents and in the published literature. All of these designs apparently function properly, though some are more highly preferred by virtue of lower cost, greater durability, and/or higher efficiency. A major problem has been the cost of this energy relative to the cost of energy from other sources. Another problem has been the inability of most of these collectors to operate at sufficiently elevated temperatures, or under conditions of low ambient temperatures of low solar insulation. Practically all of these designs have not reached the market place, and those that have, generally have been unable to compete in price with other sources of energy.

Further, the prior art solar collectors are inefficient and/or high cost relative to the collector design presented here, either by virtue of lacking certain design features which are important for efficient solar energy collection, or by lacking design or production features needed to achieve low cost, or for both of these reasons. The important features required to obtain high efficiency and low cost are selective absorption, vacuum, approximately ideal concentration, the use of low cost materials and processes for fabrication, and functional integrity.

SUMMARY OF THE INVENTION

This invention concerns a fixed, evacuated, solar thermal energy collector utilizing approximately ideal concentration, selective absorption, low cost materials and processes for its fabrication, and functional integrity. The solar collector of this invention is rather unique in its emphasis on functional integrity. It is functionally integrated to the point where the solar collector panel of this invention consists essentially of just three parts: A pre-formed glass sheet which serves as a window and top of the vacuum envelope, a partly mirrored pre-formed glass sheet structured to serve as an approximately ideal concentrating surface and bottom of the vacuum envelope, and a parallel absorbing tube network, which receives and converts the concentrated solar radiation into heat.

Functional Integrity in a solar collector is defined as a structure which integrates or combines functions commonly served by different elements of a solar collector such that a single element serves multiple functions. This integration is done in such a manner that performance is improved and the structure simplified, thereby also reducing cost.

High efficiency of this collector is achieved by the use of vacuum, approximately ideal concentration, selective absorption, and functional integrity. Functional integration of much of the manifolding within the vacuum of each panel where it can serve as part of the absorbing surface and also use the vacuum insulation of the panel is an important factor in obtaining high efficiency. Low cost is achieved by the use of low cost materials, light weight, high efficiency, and ease of fabrication, through the use of a simple integrated design and standard low cost glass forming procedures. Using approximately ideal concentration reduces the cost appreciably, at the expense of somewhat reduced heat collection, by eliminating the need for tracking.

Thus, the solar collector of this invention places the manifolding inside the vacuum of each solar collector panel to serve as part of the solar energy absorbing surface, thereby integrating the solar energy collection function and the heat transfer fluid distribution function. Further, the vacuum of the panel of this invention fulfills the dual function of thermally insulating both the absorbing surface and the manifolding. Prior art solar collectors have external manifolding.

It is an important feature of the panel of this invention that heat transfer fluid flow within the panel is parallel flow, as provided by internal manifolding. Series flow would yield a noticeably higher temperature rise and radiative heat loss.

Placing the manifolding inside the panel in vacuum, where it is part of the absorbing tube network, increases the quantity of solar energy collected by about 10 to 20%, for solar collector panels with an area of about one to two square meters, for example. In addition, the use of internal manifolding should reduce the cost of a collector array by a similar 10 to 20%, or more, relative to an array which uses external manifolding.

The panel of this invention integrates the function of concentration with the vacuum envelope function, by having mirror coated concentrating troughs formed in the lower glass sheet, which also serves as the lower portion of the vacuum envelope. Prior art solar collector designs which place the concentrating mirror outside the vacuum can have tarnishing or scratching of the mirror, plus the collector of dust or snow in the concentrating trough. In addition, the gap loss arising from the gap between the concentrating trough and the absorbing tube is unnecessarily large, because of the presence of the vacuum envelope. Other designs protect the external mirror concentrating trough by placing an additional window over the mirror, at added cost and additional reflection loss.

Many prior art solar collectors use individual solar collector tubes. These tubes must be formed into an array of tubes using external manifolding. In effect, by this invention, a set of prior art collector tubes and their external manifolding are integrated into a single unit, a panel.

Prior art solar collector tubes or panels choose materials, designs and processes which lead to heavy and/or expensive collector arrays. The panel of this invention is light in weight, easily formed at low cost from low cost materials.

Note that it is a simpler procedure to etch or coat the upper glass sheet to reduce window reflection loss, prior to assembling the panel, than it is to reduce window reflection loss for many of the prior art evacuated collectors. Note also that it is a much easier task to coat the upper surface of the lower glass sheet with a mirror prior to joining the two glass sheets, than it is to produce a mirror coating for many of the prior art evacuated collectors.

The solar collector of this application is unique in its choice of features for its design which optimize its performance while minimizing its cost. The unique simplicity of this design and the judicious selection of materials and fabrication processes lead to low cost. The choice of design features which minimize heat loss and maximize solar energy collection lead to a highly efficient collector which can operate from near ambient temperatures up to temperatures approaching 300 degrees C.

A property of the solar collector panel of this invention is its low transmittance of heat and radiation of solar and infrared wavelengths. Thus, the panel or array of panels of this invention can serve the dual purpose of solar collector and energy shield. When the panel or array of panels serves as part of the roof or walls of a structure, little radiant energy or heat is transmitted through the panel part of the structure. The cost of the structure is also reduced over the cost with collector panels separate from the roof or walls. This dual purpose use of the solar collector panels of this invention as solar collector and heat shielding wall and/or roof of a structure improves the functional integrity of the solar collector panels.

There exists a continuing need for a low cost, highly efficient solar collector, which is not well satisfied by prior art collector designs. Further, there exists a continuing need for a low cost, highly efficient solar collector which can operate at temperatures well above ambient. In addition, there is a need for a solar collector which can be easily assembled from simple, low cost, highly efficient units of moderate area to form larger area arrays.

Accordingly, it is an object of this invention to provide thermal energy by the conversion of solar radiation into heat in a highly efficient and low cost manner. Further, it is an object of this invention to provide this thermal energy at temperatures which can approach approximately 300 degrees C., without tracking the sun. It is also an object of this invention to provide efficient, low cost solar energy collecting units (panels) of light weight and moderate area, which can be joined simply to form an array of larger area, without the use of extensive external manifolding. The panels can also serve the dual purpose of an energy shield and part of the walls or roof of a structure.

BRIEF DESCRIPTION OF THE DRAWINGS

The following is a brief description of the accompanying drawings.

DESCRIPTION OF THE PREFERRED EMBODIMENT

The Panel

Figure 10:
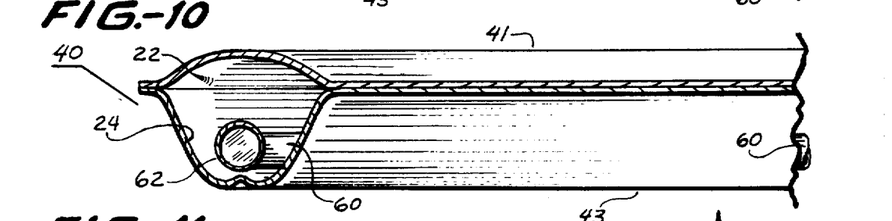
FIG. 10 is a partial cross sectional of the solar collector panel taken along the line 10 of FIGS. 2 and 6.
Figure 11:
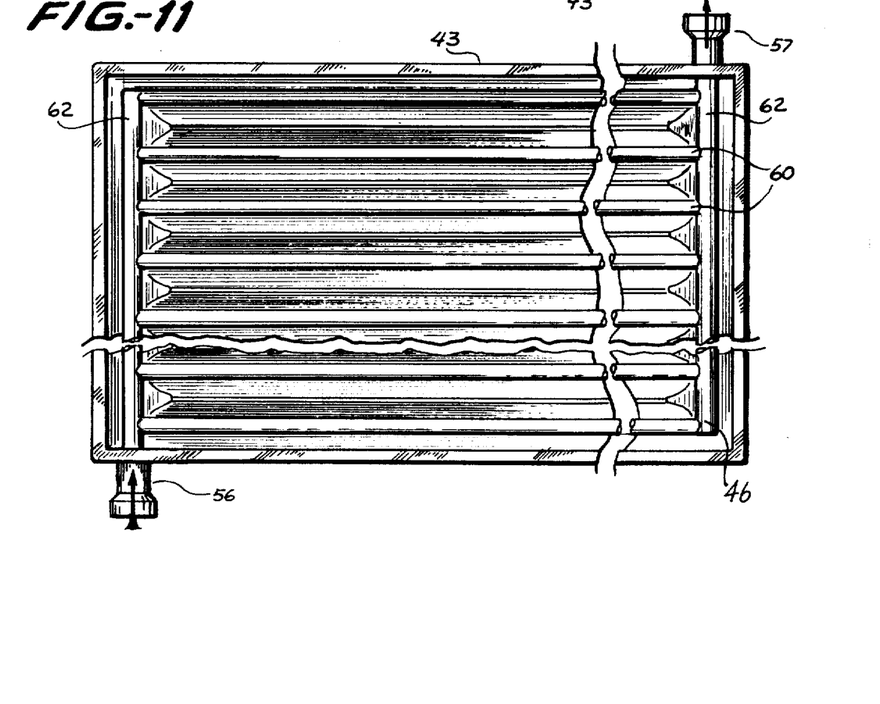
FIG. 11 is a broken top view of the lower glass sheet with the absorbing tube network in place above it to receive the concentrated radiation, showing the tube network having respective entrance and exit.
Figures 12, 13, 14, 15, 16:
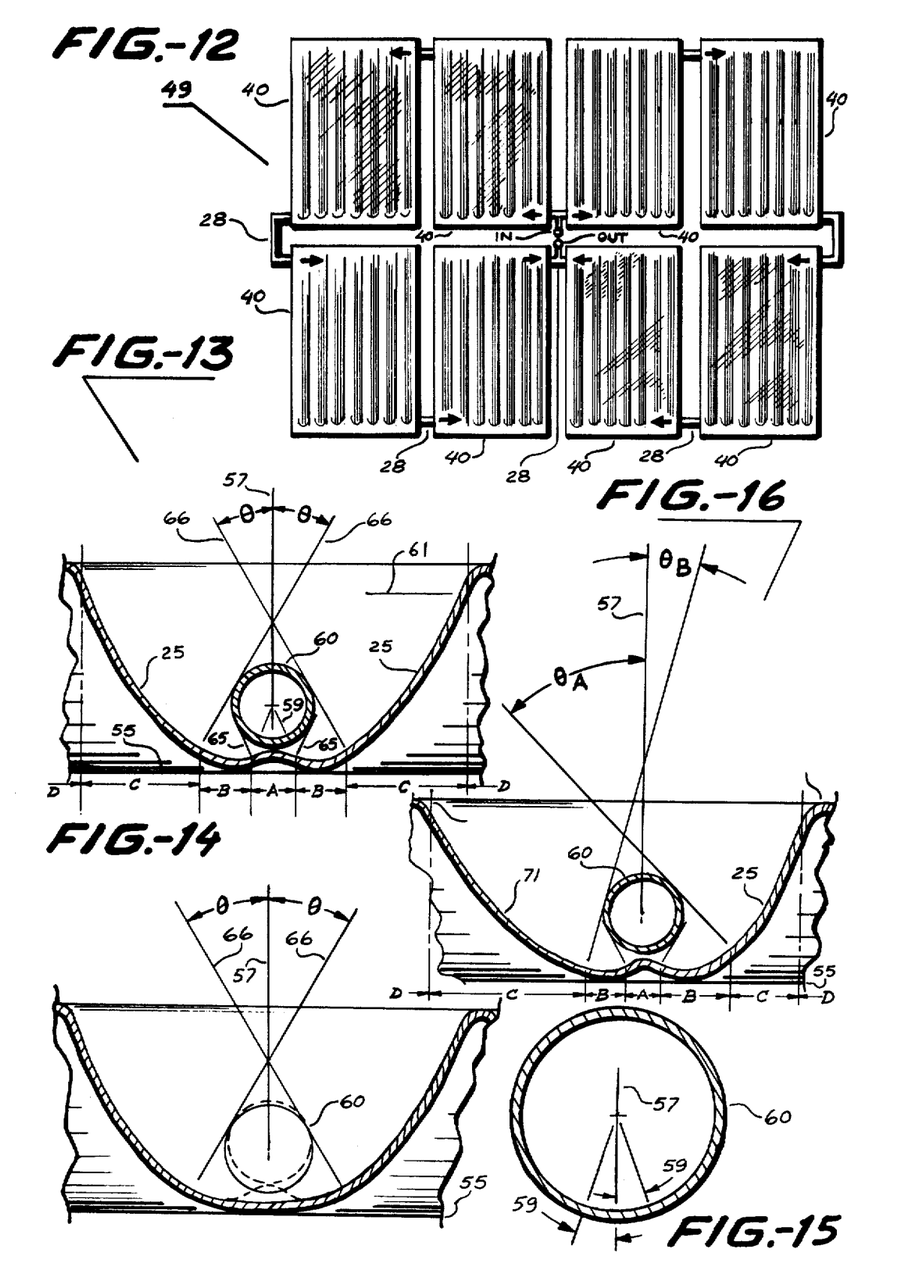
FIG. 12 is a preferred connection of eight panels into a small area array.
FIG. 13 is a diagrammatic representation of a symmetrical concentrating surface.
FIG. 14 is a diagrammatic representation of an alternate form of concentrating surface.
FIG. 15 is a cross sectional view of an absorbing tube to show the involute angles.
FIG. 16 is a diagrammatic representation of an asymmetrical concentrating surface.

FIGS. 1-11 shows the principal features of the solar collector panel 40 of this invention and FIG. 12 shows one possible connection of said panels 40 into a small area array 49.

Figures 1, 2, 3:
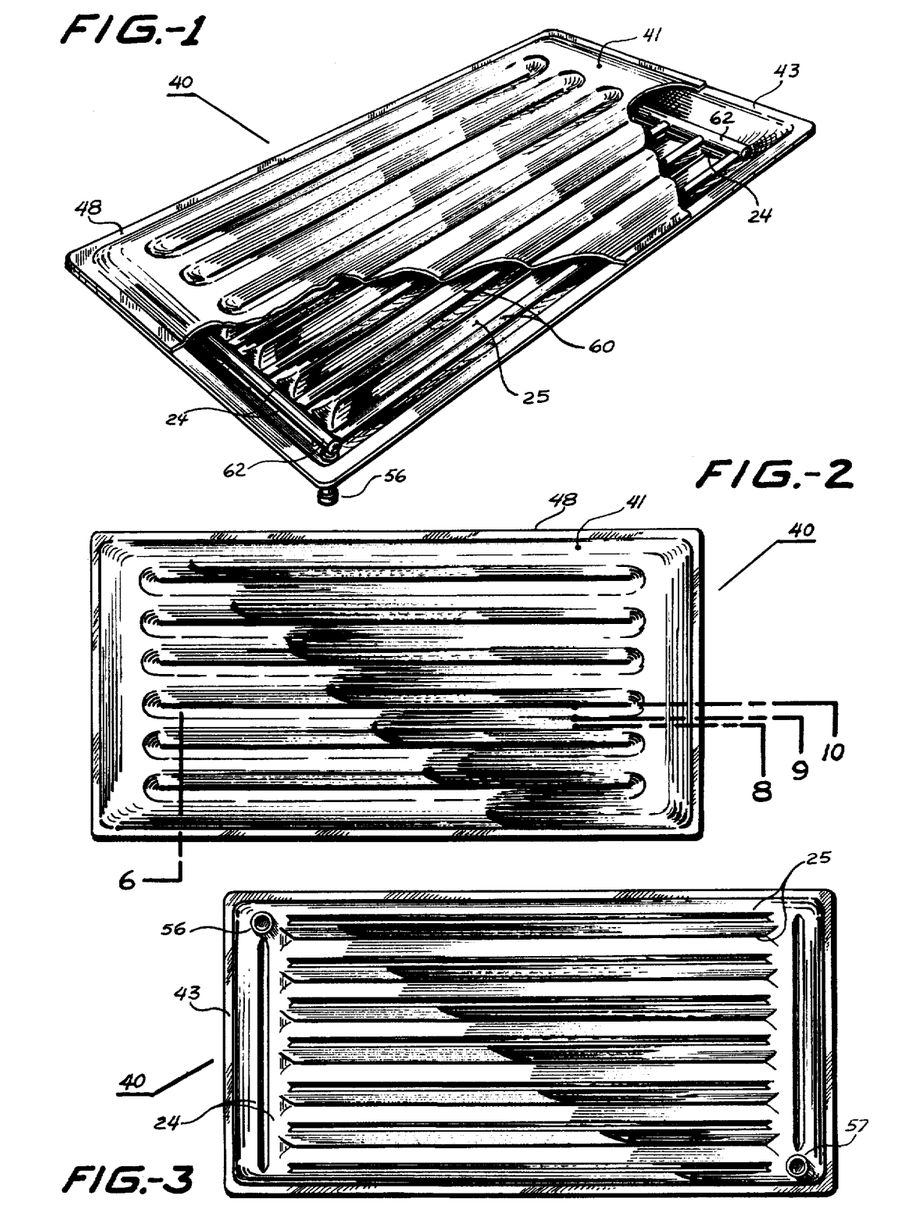
FIG. 1 is a perspective view of the solar collector panel of this invention with the upper glass sheet partially cut away to show the concentrating surface and absorbing tube network.
FIG. 2 is a top plan view of the solar collector panel.
FIG. 3 is a bottom plan view of the solar collector panel.

FIG. 1 shows said panel 40 with its three principle components. The upper glass sheet 41 is partially cut away to show the upper surface of the lower glass sheet 43 and the absorbing tube network 46 positioned between said sheets 41 and 43.

Figure 4:
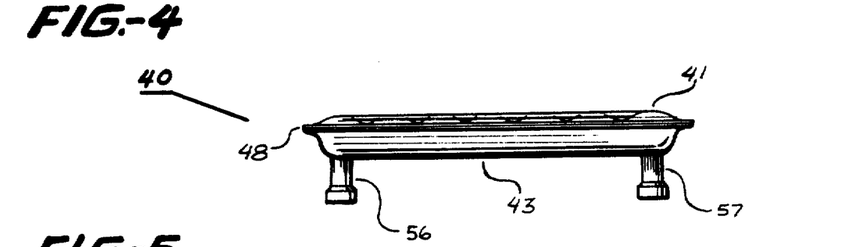
FIG. 4 is an end elevational view of the solar collector panel.
Figure 5:
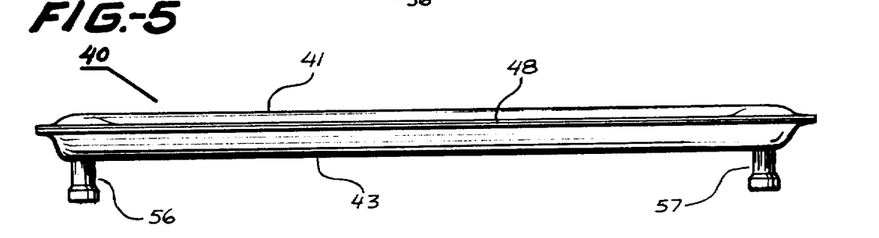
FIG. 5 is a side elevational view of the solar collector panel.

FIG. 4 is an end view of said panel 40 and FIG. 5 is a side view of said panel 40.

With regard to this description, like numerical designations in the respective figures represent like structures.

The area of said panel 40 should not exceed approximately three square meters, if said panel 40 is to be hand carried during assembly of a panel array (see 49 of FIG. 12) of said panels 40. Said panel 40 should have an area approaching one square meter or larger to reduce the panel array cost. The area of said panel 40 should not be deemed limited to such range.

Although the rectangular shape of said panel 40 is preferred, other shapes, such as a triangular or pentagonal, which might be used as part of a geodetic dome structure, are also possible and should be considered within the scope of this invention.

The Upper Glass Sheet

Figures 6, 7:
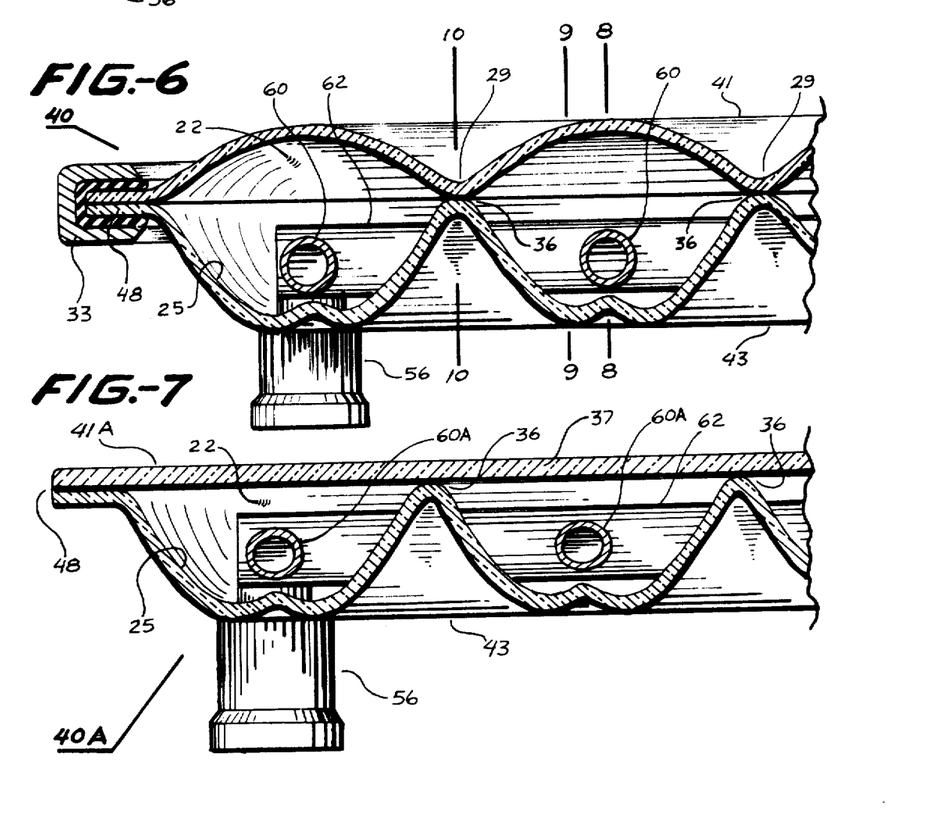
FIG. 6 is a partial cross sectional view of the solar collector panel, taken along line 6 of FIG. 2, shown with a frame and a fluted upper glass sheet.
FIG. 7 is a partial cross sectional view of an alternate embodiment of the solar collector panel shown with a flat upper glass sheet taken along a line corresponding to line 6 of FIG. 2.

FIG. 2 shows a top plan view of said panel 40. Said upper glass sheet 41 is formed to have fluting 29, indicated more clearly in FIG. 6. FIG. 6 is a partial cross section along line 6 of FIG. 2 showing the internal structure of panel 40. Said fluting 29 strengthens said panel 40 and makes it highly rigid and able to support the atmospheric pressure on its upper surface. Said fluting 29 bridges the spaces between the surfaces of contact 36 of said upper 41 and lower 43 glass sheets. Said fluting 29 can have a radius of curvature between about 0.8 and 1.2 times the spacing between said surfaces of contact 36. Said upper glass sheet 41 serves as the window to transmit solar radiation in to the vacuum region 22, where it will be concentrated onto said absorbing tube network 46.

Alternatively, the window may consist of a plane upper glass sheet 41A of greater thickness forming an alternate flat panel 40A as shown in FIG. 7. Said flat panel 40A will be similar in features to said panel 40 except for said plane upper glass sheet 41A. Said fluted upper glass sheet 41 forming the upper part of the vacuum envelope of said panel 40 is the preferred embodiments, since it provides said panel 40 of lighter weight using less material.

The thickness of said fluted upper glass sheet 41 or said plane upper glass sheet 41A must be sufficient to withstand atmospheric pressure, and, in addition, take blows from any objects, which may have reasonable probability of striking said upper glass sheets 41 or 41A. This thickness could be as small as about one millimeter and as large as about five millimeters.

The Lower Glass Sheet

Figure 8:
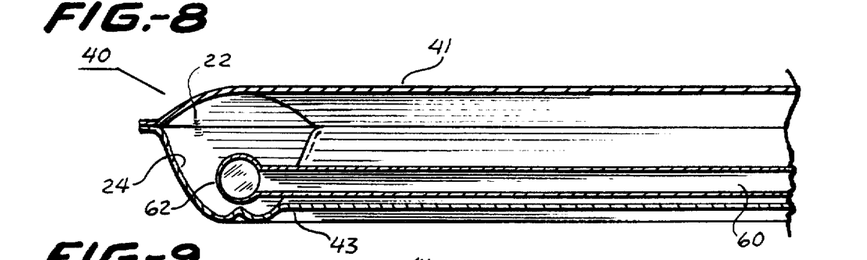
FIG. 8 is a partial cross sectional view of the solar collector panel taken along the line 8 of FIGS. 2 and 6.
Figure 9:
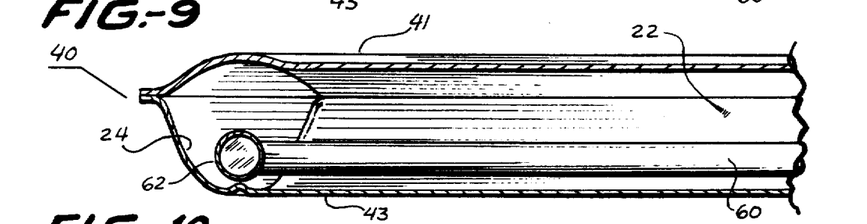
FIG. 9 is a partial cross sectional view of the solar collector panel taken along the line 9 of FIGS. 2 and 6.

Referring to FIGS. 1 and 3 said lower glass sheet 43 consists of a series of parallel concentrating troughs 25 terminating at each end in a manifold concentrating trough 24. A partial cross section of said parallel concentrating troughs 25 is shown in FIG. 6 or 7, while a possible cross section of one of said manifold concentrating troughs 24 is shown in FIGS. 8 through 10. The shape of the top surface of said parallel concentrating troughs 25 and manifold concentrating troughs 24 in said lower glass sheet 43 provides approximately ideal concentration onto said absorbing tube network 46. Said troughs 24 or 25 make said lower glass sheet 43 strong and highly rigid as the lower part of the vacuum envelope.

The inside of the concentrating troughs 24 and 25 of the lower glass sheet 43 are coated with silver, aluminum, or other mirror coating. This places the mirror surface inside the vacuum, which is preferred.

Alternatively, an external, surface mirror could be used on said lower glass sheet 43. However, it has less protection, is more costly, has a higher gap loss and a lower reflection coefficient than a mirror in vacuum. An external mirror can be applied after said panel 40 is sealed, evacuated and baked out, so it need not endure high temperatures. In some applications, this may be advantageous.

The thickness of said lower glass sheet 43 is expected also to be between about one millimeter and five millimeters.

The Vacuum Region

Said vacuum region 22 is indicated in FIGS. 6 through 10. Said vacuum region 22 serves to insulate said absorbing tube network 46 by largely eliminating conduction and convection heat losses.

Although said vacuum 22 is necessary for efficient operation of said panel 40 at higher operating temperatures, said panel 40 will also serve as a collector of solar thermal energy at lower operating temperature when the vacuum region 22 is not evacuated or is only partially evacuated. A panel without vacuum is considered within the scope of this invention.

The Frame

In FIG. 6, the glass edge 48 of said panel 40 is provided with an optional frame 33 to prevent cracking of the glass and to protect the vacuum seal. Said frame 33 can also be used for said alternate flat panel 40A of FIG. 7. Alternatively, protection of said edge 48 can be achieved when forming said array 49 of said panels 40 (see FIG. 12) at the collection site. The frame 33 shown in FIG. 6 is appropriate for all configurations of the panel 40, but is not shown for clarity in presenting other features.

The Absorbing Tube Network

Referring to FIG. 11, said absorbing tube network 46 is a series of parallel members 60 terminating at opposite ends in respective entrance and exit manifold tube 62, (see also FIG. 1). Series networks or hybrid series/parallel networks (not shown) are possible, but are not preferred since the parallel network 46 is more efficient. As shown in FIG. 12, panel 40 having a parallel absorbing tube network (not shown) is suitable for the arrays 49 of larger area. A series network would not generally be used for an array of larger area because of the larger temperature rise of a heat transfer fluid along the flow length.

Returning to FIG. 11, said tube network 46 may be made of glass or a metal, such as copper or stainless steel. If a low thermal expansion glass, such as borosilicate glass, is used for said tube network 46, and a high expansion glass, such as soda lime, is used for said upper and lower glass sheets 41 and 43 to reduce cost, then graded seals will be required at the entrance 56 and exit 57 from said panel 40. Two glass to metal seals are required, if a metal tube network 46 is to be used.

Alternatively, the entrance 56 and exit 57, from said panel 40 for the purpose of enabling the introduction and removal of a heat transfer fluid from said absorbing tube network 46, could be vertically through the bottom of said lower glass sheet 43 below opposing corners of said absorbing tube network 46, as shown in FIGS. 4 through 7, or through the sides of said lower glass sheet 43 at opposing corners, as shown in FIG. 11, or by other means, such as through said upper glass sheet 41.

Although said entrance 56 and exit 57 from said panel 40 near opposite corners is preferred, other arrangements, such as parallel flow with entrance and exit at the same corner or both at the middle of one side are also possible and are considered within the scope of this invention.

Figures 18, 19A:
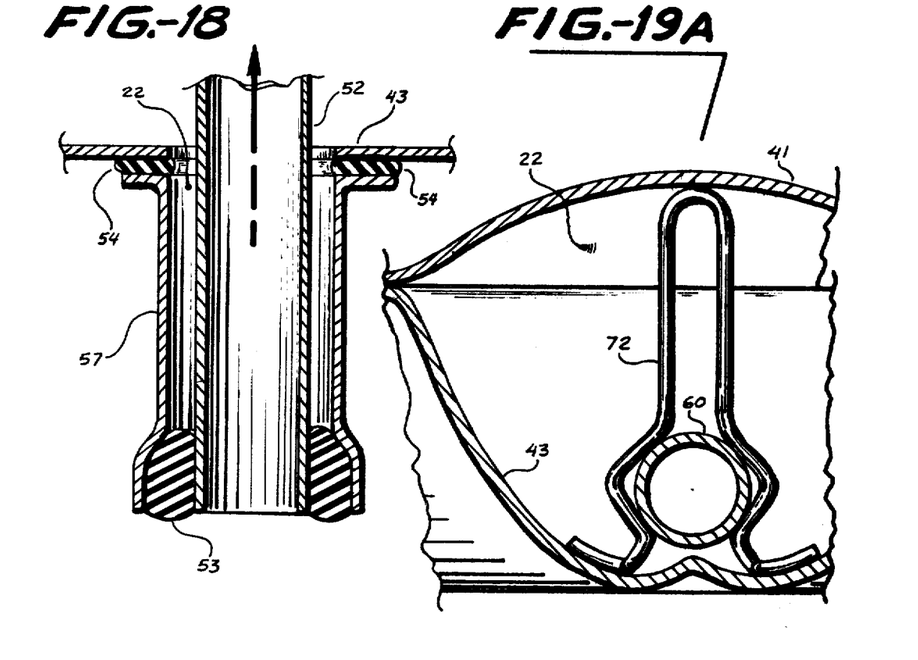
FIG. 18 is a broken cross section showing the structure of the entrance of the tube network to the panel for a heat transfer fluid.
FIG. 19A is an end view of a wire clip of the type which can be used to support the absorbing tube network shown mounted between an upper and lower glass sheet.

A graded seal 57 is shown in FIG. 18, and is coaxial with, and external to, the tubes 52 exiting the panel 40, which carries the heat transfer fluid. Said seals 57 could be joined with a vacuum tight seal 53 to said tubes 52 at their terminating end. The other end of said seals 57 is joined with a vacuum tight seal 54 to said lower glass sheet 43. The diameter of said tubes 52 is approximately the same as the manifold absorbing tubes 62. Analogous structure is provided for the entrance 56.

Referring to FIGS. 6–11, the parallel absorbing tubes 60 of said absorbing tube network 46 are approximately perpendicular to the manifold absorbing tubes 62 at each end. The angle may be altered somewhat from 90 degrees to aid in filling and draining the heat transfer fluid from said array 49 (FIG. 12) of said panels 40.

Note that location of said entrance 56 and exit 57 of the heat transfer fluid near opposite corners of said panel 40 allows approximately uniform flow of the heat transfer fluid through said absorbing tube network 46. In addition, this allows thermal expansion of said tube network 46 relative to said upper and lower glass sheets 41 and 43 which form the vacuum glass envelope, without undo stress or motion of said network 46 away from the position of optimum concentration of the solar radiation. Because of the thermal expansion, the width of said panels 40 should not be too large or too small relative to its length. The heat transfer calculations, discussed below, which maximize the efficiency of said panel array 49, (FIG. 12) help insure that said panel widths are not too small or too large.

Thermal expansion will begin to move said parallel absorbing tube members 60 and said manifold absorbing tube members 62 of said absorbing tube network 46 out of the position of optimum concentration and reduce the collector efficiency, if either said length or width of said panel 40 exceeds about one to two meters.

The preferred shape for said parallel absorbing and manifold tube members 60 and 62 cross sections is circular, since this provides the most efficient heat transfer at lowest cost for a fixed tube surface area. However, other shapes, such as oval (see 60A, FIG. 7), are deemed to be within the scope of this invention. The diameter of said parallel absorbing tubes 60 can be in the range from about 4 millimeters to about 50 millimeters. The preferred diameter is in the range from about 4 millimeters to about 16 millimeters, when the heat transfer fluid is a liquid. The preferred diameter for said absorbing manifold tubes 62 is larger than that of said parallel absorbing tubes 60 by a factor of about $\sqrt{0.3\,N}$, for most efficient operation. Here, N is the number of parallel absorbing tubes 60.

The preferred orientation of said parallel absorbing tubes 60 in said absorbing tube network 46 will generally be horizontal, with axes east-west, although other orientations, usually with larger maximum angles of acceptance and higher heat loss, are also possible. Said absorbing tube network 46 has a surface coating of a selective absorber.

Although a selective absorber with a high selectivity ratio of solar absorptance to infrared emittance is desired for operation of said panel at temperatures towards the upper limit of its useful range of operating temperature, an absorbing surface with little or no selectivity is also possible for low temperature operation and should be considered within the scope of this invention.

Since photovoltaic surfaces are dark to the sun, the absorbing surface could consist of a photovoltaic surface, such that the surface could be used to generate electric current as well as heat.

The Concentrating Surface

The shapes of both said parallel and manifold concentrating troughs (25 and 24) generally have the same features and are described in the same manner except as noted below. For the purpose of discussing the shape of said concentrating troughs 24 and 25 in said lower glass sheet 43, we define the panel plane 55 of said lower glass sheet 43 as being a plane tangent to the set of parallel concentrating troughs 25 at their lowest point. Part of said panel plane 55 is indicated in FIGS. 13, 14, 16, and 17 showing possible forms of said concentrating trough 24 or 25 shapes. Note that the maximum angle of acceptance theta ($\theta$), truncation 61 (to be discussed below), and scale of said manifold troughs 24 may differ from that of said parallel troughs 25. The scale is determined by said absorbing tube 60 diameter.

Referring to FIGS. 13, 14, 16 and 17, angles for solar radiation are measured with respect to the normal to the panel plane 67 in the transverse plane of FIGS. 13, 14, 16 and 17. Said transverse plane is normal to the axis of said absorbing tube 60. Rays of solar radiation are projected onto said transverse plane.

The maximum angle of acceptance theta for ideal concentration of solar radiation is the angle such that, radiation incident outside said angle theta is rejected by the collector and radiation inside said angle theta is accepted. For approximately ideal concentration, there is no sharp boundary between acceptance and rejection. In this case, said maximum angle of acceptance theta is usually defined to be that of the ideal concentration which it approximates. Angle theta for a symmetric, approximately ideal, cylindrical concentrating surface is shown in FIG. 13.

In FIG. 13, one embodiment of said concentrating trough 25 surfaces of this invention may consist of four symmetrical parts. The lower rounded ridge A in the bottom of said concentrating trough 25 has a radius of curvature which is approximately as small as is readily obtainable in forming said lower glass sheet 43 by sagging, or other means. The radius of curvature depends upon said lower glass sheet 43 thickness, which is made the minimum thickness required for sufficient structural strength. The shape of the mold used for pre-forming said lower glass sheet 43 differs from the upper, concentrating surface of said sheet 43, by the thickness of the glass. Thus, in many cases, the ridge in the mold may approximate a cusp, in order to yield a small radius of curvature of said lower rounded ridge A. For example, if the separation between adjacent surfaces of contact 36 is about 7 centimeters, the thickness of said lower glass sheet 43 is 2 millimeters, and the ridge in the mold below said lower rounded ridge A approximates a cusp, then the radius of curvature of said lower rounded ridge A can be about 3 millimeters.

Alternatively, said lower rounded ridge A could be lowered or omitted and said concentrating trough 25 surface could consist of a smooth curve between approximately the minima on either side of said lower rounded ridge A. Additionally, said absorbing tube 60 could be enlarged and its center lowered to reduce gap loss. These changes are indicated by one example in FIG. 14. The dashed lines in the figure show the original shape of FIG. 13. This approach is less optimum.

Alternatively, said lower rounded ridge A could be replaced by grooves below said absorbing tube 60 in the manner of Winston and McIntire, above. Obtaining sufficiently well formed grooves is not an easy operation.

Said lower rounded ridge A surface joins smoothly on each side with the involute surfaces B whose shape is obtained from the two involutes of said absorbing tube 60, which start at an involute angle 59 of about 3 to 12 degrees on either side of the bottom of said absorbing tube 60. FIG. 15 shows an enlarged view of said absorbing tube 60, where said involute angles 59 are indicated. Said involute angles 59 are selected so that the curved shape for said lower rounded ridge A and said involute surfaces B join with the same slope. Said involute angles 59 are determined by the thickness of the glass, the temperature conditions during sagging, and the pressure reduction, if any, below said lower glass sheet 43 while sagging, if this method of forming is used. It is set in practice by computer calculations of the shape, and trial and error in forming prototypes. The use of reduced pressure below said sheet 43 during sagging reduces the time of forming and improves the fit to the mold. Use of said involute angles 59 differing from zero here allows the sagged glass to follow more closely the desired, approximately ideal, concentrating shape. The magnitude of said involute angles 59 should be limited so as not to reduce the concentration ratio appreciably.

Referring again to FIG. 13, the generators 65 of said involute surfaces B are shown at the points where said involute surfaces B start. Said involute surfaces B are continued, on each side, to the point where a plane 66 intersecting said surface B and tangent to said absorbing tube 60 makes an angle with said normal to the panel plane 57 equal to said maximum angle of acceptance theta desired. The intersection of said planes 66 with said involute surfaces B are shown in FIG. 13.

Figure 17:
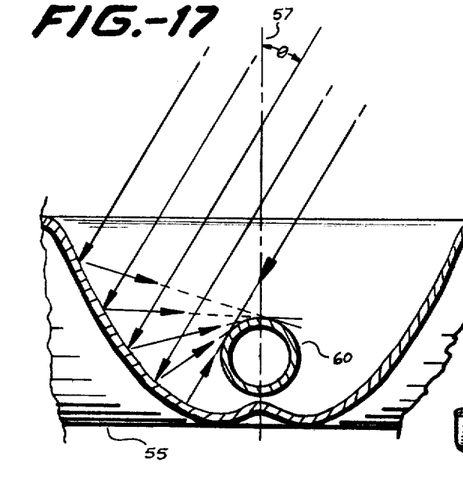
FIG. 17 is a diagrammatic representation showing radiation incident at the maximum angle of acceptance being reflected by the concentrating surface so as to be tangent to the absorbing tube.

Above this intersection, the upper concentrating surface C on each side can be formed such that radiation, incident at said maximum angle of acceptance theta, when projected onto said transverse plane of FIG. 13, is reflected to be tangent to the upper surface of said absorbing tube 60. FIG. 17 shows reflection of radiation incident at said maximum angle of acceptance.

Said upper concentrating surfaces C above each of said involute surfaces B are terminated or truncated 61 before reaching a slope which is normal to said panel plane 55 and making the transition to the upper rounded half ridge D. This is partly to facilitate the sagging, or other process of forming said lower glass sheet 43, and removing it from the mold. Such truncation shortens the sagging time and increases the strength of said sheet 43 by eliminating the part of the surface with least curvature. It also reduces the amount of concentrating surface without reducing the concentration ratio appreciably. Generally the slope relative to said panel plane 55 at truncation should not exceed approximately ten and/or the height of said concentrating trough 25 surface above the top of said absorbing tube 60 should not exceed approximately two absorbing tube 60 diameters.

Because of truncation, the lengths of the projection of said upper concentrating surfaces C in FIGS. 13 and 14, for example, allow their representation by the arcs of circles, which yield approximately the same effective said maximum angle of acceptance theta. Using the arc of a circle can lead to simpler formation of the mold.

Alternatively, said concentrating trough 25 surface may be formed to limit the angle of incidence on said absorbing tube 60, eliminating some of the tangential or near tangential radiation. This shape also should include said rounded ridge A at the bottom of said concentrating trough 25 and truncation of said upper concentrating surface C. There is little difference between this approach and that above, since much of the tangential or near tangential radiation in the first case occurs near said maximum angles of acceptance theta. Said maximum angle of acceptance theta in the first case can be increased slightly to make these two cases nearly the same.

Alternatively, said concentrating trough 25 shape could be described by a mathematical curve which approximates ideal concentration. However, there appears to be nothing gained by this approach.

Concentrating troughs 25 which are symmetrical, such as indicated in FIGS. 6, 7, 8-10, 13, 14 and 17 are suitable, for example, when approximately equal exposure to sunlight on each side of said normal to the panel plane 57 is expected and desired. This might be the case if said parallel absorbing tubes 60 in said absorbing tube network 46 are approximately horizontal and oriented east-west, and said panel plane 55 is tilted toward the equator at the latitude angle.

Alternatively, an asymmetrical concentrating trough 71 surface may be used, instead of symmetrical troughs 25, with differing values for said maximum angle of acceptance on each side, theta A and theta B, as shown in FIG. 16. Such a design may be suitable, for example, when said parallel absorbing tubes 60 of said absorbing tube network 46 are horizontal and oriented east-west, but said panel plane 55 is not tilted at the latitude angle. This might be the case when mounting said array 49 flush with an equatorial facing roof with slope differing from the latitude angle. The various parts of said asymmetrical concentrating trough 71 surface can be generated in a manner similar to said symmetrical concentrating trough 25 surface of FIG. 13, and are numbered in a corresponding manner. A panel (not shown) which uses said asymmetrical concentrating troughs 71 of the shape shown in FIG. 16 can be suitable for flush mounting on a roof with the common 1:3 equatorial facing slope. This is for approximately equal exposure in winter and summer when sited at a latitude near 33 degrees. Horizontal mounting, except at tropical latitudes, generally leads to noticeably higher window reflection losses. Horizontal or near horizontal mounting is appropriate, if said absorbing tube network 46 is a heat pipe network for heat removal.

Referring again to FIGS. 13, 14 or 16, the final part of said concentrating trough 25, the upper rounded half ridge D, reverse the sign of the curvature to bend said surface over to meet the surface of the next concentrating trough 25, or other neighboring structure of said lower glass sheet 43. Said upper rounded half ridge D should have the maximum curvature readily attainable for the thickness of said lower glass sheet 43 used, since this part of said concentrating trough 25 surface does not contribute to the concentration. It also need not be silvered. The maximum curvature is expected to be determined by the ease of removal of said lower glass sheet 43 from the mold after sagging, or other method used for forming. This radius of curvature is expected to be in the range from about one to about ten times the thickness of said glass sheet 43.

Some deviation from ideal concentration will occur and may be necessary because of structural design. In addition, some slight waviness in the surface of said lower glass sheet 43 may occur during the forming of said sheet 43. Minor waviness has little effect on the collector efficiency. However, a microscopically smooth mirror surface is required for proper concentration. This is the purpose of placing the lower rather than the upper surface of said lower glass sheet 43 in contact with the mold during sagging, if sagging is used to form said lower glass sheet 43.

Referring to FIG. 13 or 16, if an external rear surface mirror is to be used, sagging may be accomplished using a mold which contacts said lower glass sheet 43 only at said lower rounded ridge A if not omitted, and said upper rounded half ridges D. Some practice in adjusting the temperature distribution and pressure difference across said lower glass sheet 43, if any, could be required, to obtain a shape close to that desired for the approximately ideal concentration.

Said concentrating troughs 24 of said absorbing manifold tubes 62 have a shape which can be generated generally in the fashion previously described for said parallel concentrating troughs 25. However, said manifold troughs 24 differ in certain respects. The intersection of said parallel concentrating troughs 25 with said manifold concentrating troughs 24 eliminates part of the inner concentrating surface of said manifold concentrating troughs 24. In addition, the scale and said maximum angles of acceptance theta or theta A or theta B of said troughs 24 can differ.

The Absorbing Tube Network Support

Figure 19B:
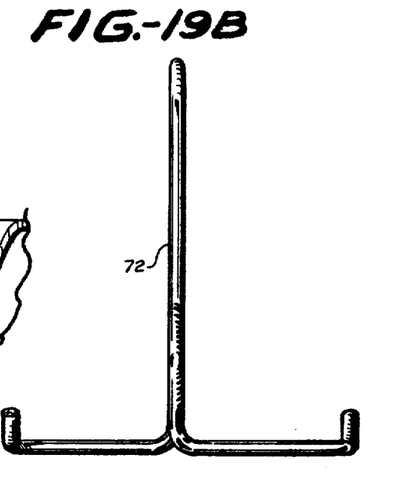
FIG. 19B is a side view of the wire clip of FIG. 19A.

In order to achieve high concentration efficency, said absorbing tube network 46 must be positioned close above said lower rounded ridges A (see FIG. 19A). The separation depends upon the radius of curvature of said lower rounded ridge A, since the position of each of said absorbing tubes 60 is fixed with respect to the rest of said concentrating trough 25 for approximately ideal concentration. The separation between said absorbing tube 60 and said lower rounded ridge A should be of the order of 0.5 millimeters or somewhat larger. Because of this small separation, said absorbing tube 60 requires support along its length approximately every one-half meter to keep said tubes 60 from sagging and touching said ridges A. Wire supports 72 of the type shown in FIGS. 19A and 19B provide sufficient support with little heat conduction loss. Other methods of support with low conduction loss are also possible. Stainless or spring steel wire, possibly coated with a thin layer of copper, is preferred for these supports. The wire diameter should be about one millimeter, when said absorbing tube 60 diameters are in the preferred range.

As shown in FIG. 19A the wire supports 72 are rigidly bound between the upper and lower glass sheets 41 and 43. Similar wire supports 72 can be used for the flat topped panel 40A, as shown in FIG. 7, and within the manifold concentrating trough 24.

The Collector Array and Energy Shield

FIG. 12 shows how said panels 40, are joined by series-parallel connections 28 to form a small area array 49. The panels 40 are expected to be placed in near contact. This reduces the length, and thus the conduction heat loss and cost, of said connections 28. Said connections 28 are leak tight and insulated against heat loss using materials and processes, which are known in the industry.

Sealing the edges of neighboring panels 40 together can allow the array 49 to serve as part of a roof or wall of a structure. When an array 49 serves as an integral part of a structure in this manner, the total cost of the structure is reduced, and its attractiveness is increased. Such an arrangement permits said array 49 to serve as a collector, part of a wall or roof, and as a heat shield against transmission of heat and radiation of solar and infrared wavelengths.

Heat Transfer and Radiation Collection Calculations

Heat transfer and radiation collection calculations have been performed to determine the conditions leading to maximum efficiency for a collector of this type. They have been applied to said array 49 (FIG. 12) of said panels 40, in series-parallel combination. The total of these heat transfer and radiation collection calculations, along with considerations of ease in fabrication and cost, are used to establish said array 49 and panel 40 dimensions. The preferred size of said absorbing manifold tube 62 relative to said parallel absorbing tube 60, discussed above, is determined by these calculations. Calculations of this type are described extensively by J. Garrison, above, and by J. Garrison, et al, in Proceedings of the 1978 Annual Meeting of the American Section of the International Solar Energy Society, and in the proceedings of the Fourth Miami International Conference on alternate Energy Sources, December 1981.

For another example, it has been determined that said maximum efficiency trough width is about 2 to 4 centimeters, if a liquid heat transfer fluid is used. Said trough width is taken to be the separation between the upper ends of said upper concentrating surfaces C on each side of said troughs 25 (FIG. 14). Since the maximum efficiency is broad with respect to changes in said width, said width will probably be made larger, for easier fabrication of said panels 40, and more precise formation of said concentrating trough shape 25. Said maximum efficiency width is appreciably larger when a gas is used for heat transfer fluid. A liquid appears to be preferred for heat transfer.

Figure 20:
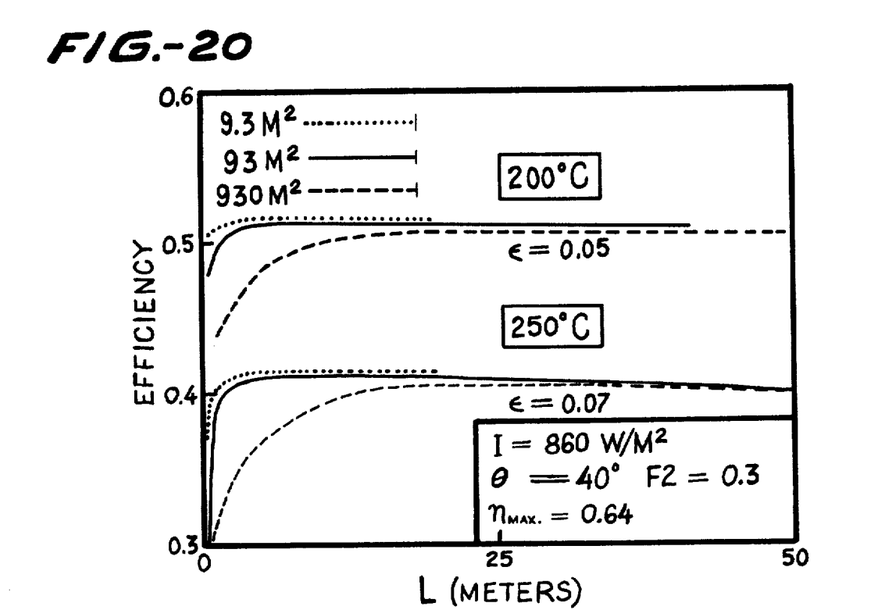
FIG. 20 is a graphical representation of the results of calculations which show how the efficiency of an array of panels varies with series flow length for three different array areas, and two operating temperatures.

FIG. 20 shows how said array 49 (FIG. 12) efficiency varies with the series flow length, for three different array 49 areas and the two operating temperatures. Such a calculation helps to set the series-parallel arrangement of said panels 40 for said array 49. Series flow length here is taken to be approximately said panel length times the number of said panels 40 connected in series in each branch of said array 49. For FIG. 12, the number of said panels 40 in series is four. In the FIG. 20, I is the solar insulation, theta ($\theta$) is said maximum angle of acceptance (symmetrical), eta ($\eta$) max the optical efficiency (zero heat loss efficiency) and F2=0.3 sets the diameter of said manifold tube 62 to the preferred value, discussed above.

Figure 21:
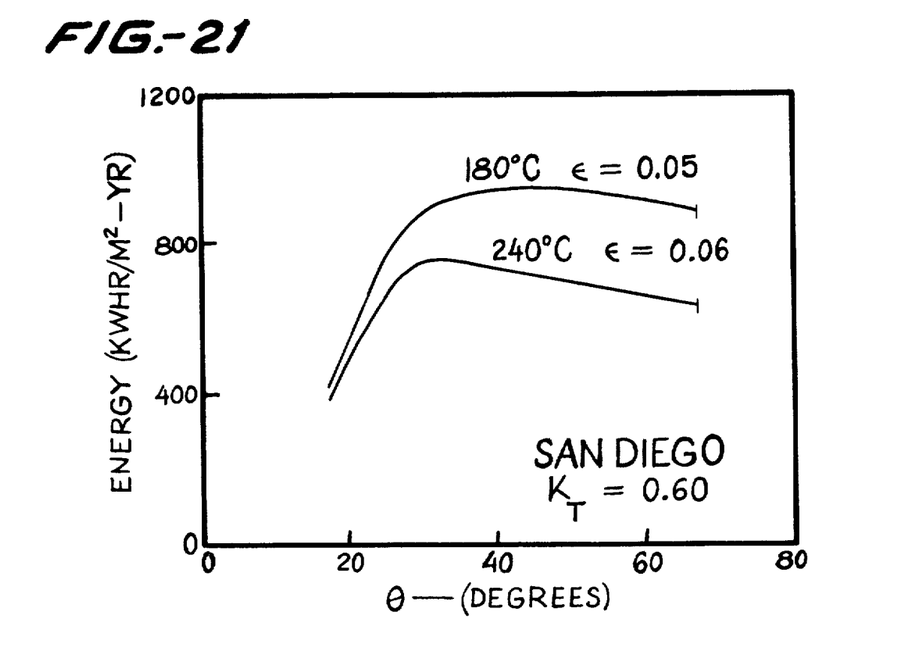
FIG. 21 is a graphical representation of the results of calculations which show how annual energy collection is expected to vary with collector acceptance angle for two collector operating temperatures, in San Diego, Calif.

The preferred maximum angles of acceptance theta or theta A and theta B are determined by the orientation of said panels 40, the operating temperature, the properties of the selective absorber, mirror, and window, the site insulation properties, and usage pattern for the collector. FIG. 21 shows how annual collection can be approximately maximized, using a computer simulation program and insulation data, by proper choice of said maximum angle of acceptance theta. For these calculations, said panels 40, are oriented with said absorbing tube 60 axes east-west and tilted at the latitude angle toward the equator. In the figure, epsilon ($\epsilon$) is the absorber surface emittance and theta ($\theta$) is said maximum angle of acceptance, as above. $K_T$ is the average annual ratio of solar radiation received on a horizontal surface to solar radiation which would be received on the same horizontal surface above the atmosphere.

Said maximum angles of acceptance theta or theta A and theta B, the amount of truncation, and said involute angles 59 determine the concentration ratio, which connects said trough width to said absorbing tube diameter.

Although approximate properties and dimensions of said panel 40 have been specified, along with the materials to be used, we do not deem the invention discussed to be limited to such materials and dimensions. Deviations and logical extensions of the invention presented here are to be considered within the scope of this invention.

The concept of this invention includes various alternative structures to the various elements within the device.

Specifically, the structure of the upper glass sheet, the entrance and exits, the degree of vacuum maintained within the panel, the type of materials used for the panel or the absorbing tube network, the panel configuration, the configuration of the absorbing tube network, and the shape of the concentrating surface each represents alternative structure elements of this invention. Each of these alternative structural elements should be considered to be alternative structures of each of the other alternative structures of each of the other elements. Accordingly, the scope of this disclosure specifically includes and relates to each of the possible alternatives.

It is understood that the description herein of my invention is done to fully comply with the requirements of 23 USC Section 112, and does not intend to limit the invention in any way, thus, varying forms of the herein described invention are considered to be within the scope of the present invention.

What is claimed is:

1. A solar collector panel consisting of:
    a lower sheet formed as a plurality of substantially parallel linear concentrating surface troughs terminating at each end in respective cross manifold concentrating surface troughs, the lower sheet having a mirrored coating;
    an upper solar transparent sheet sealed to said lower sheet whereby to form an envelope;
    an absorbing tube network having a plurality of substantially parallel longitudinal tube members terminating at each end in respective cross manifold tube members, said tube network positioned between said lower sheet and said upper sheet within said envelope whereby each of said longitudinal tube members are positioned within a respective linear concentrating surface troughs and said respective cross manifold tube members are positioned within respective manifold concentrating surface troughs;
    the tube network coated with a solar absorbing surface; and
    the absorbing tube network having an entrance sealably protruding through said envelope from one of said manifold tube members and an exit sealably protruding through said envelope from the opposite manifold tube member and said absorbing tube network being suitable for passing a heatable fluid therethrough.

2. The invention of claim 1 wherein each of said linear and manifold concentrating surface troughs includes a bottom portion, opposite partial involute surface portions, opposite upper concentrating surface portions, and opposite upper transition ridge portions;
    both of said respective partial involute surface portions having an involute angle beginning from about 3 to 12 degrees on respective sides of the bottom of said absorbing tube and continue on each side of said concentrating surface to a point where a plane intersecting said involute surface and tangent to said respective absorbing tube makes an angle with a normal to the plane of the panel which equals a preselected maximum acceptance angle for the concentrating surface;
    the respective upper concentrating surface portions joining the respective partial involute surface portions and formed such that radiation incident at the maximum acceptance angle is reflected as a tangent to said absorbing tube, said upper concentrating surface portions terminating such that the slope of said surface is about 10 or less;
    the respective upper rounded ridge portions joining the respective upper concentrating surface portions and having opposite sign of curvature whereby to provide transition to adjacent linear concentrating surface troughs or panel edges;
    said lower portion providing a smooth transition between the interior portions of said respective opposite partial involute surface portions;
    the manifold concentrating surface troughs being adapted for transition into said linear concentrating surface troughs, said linear concentrating surfaces extending the length of said absorbing tube; and
    each portion of said concentrating surface adjoining adjacent portions of said concentrating surface smoothly and with the same slope.

3. The invention of claim 2 wherein said lower portion of said concentrating surface troughs includes an upward longitudinal ridge having a radius of curvature which is between about 1 to 3 times the thickness of the lower sheet.

4. The invention of claim 2 wherein said lower portion includes one or more longitudinal grooves extending the length of said concentrating surface.

5. The invention of claim 2 wherein the maximum acceptance angle for said concentrating surface troughs is substantially equal on opposite sides of the normal to the plane of the panel.

6. The invention of claim 2 wherein the maximum acceptance angle for said concentrating surface troughs is unequal on opposite sides of the normal to the plane of the panel.

7. The invention of claim 1 wherein said absorbing tube network comprises circular cross sectional tubing.

8. The invention of claim 1 wherein said absorbing tube network comprises oval cross sectional tubing.

9. The invention of claim 1 wherein said upper sheet is glass.

10. The invention of claim of 1 wherein said lower sheet is glass.

11. The invention of claim 1 wherein said upper sheet includes a plurality of fluted contours, each of said fluted contours respectively paired to each of said linear and manifold concentrating surface troughs in said lower sheet, said fluted contours having a radius of curvature between about 0.8 and 1.2 times the width of said concentrating surfaces.

12. The invention of claim 1 wherein said upper sheet is plane.

13. The invention of claim 1 wherein said mirror coating is silver.

14. The invention of claim 1 wherein said mirror coating is aluminum.

15. The invention of claim 1 wherein said absorbing tubing is formed of glass.

16. The invention of claim 1 wherein said absorbing tube is formed of metal.

17. The invention of claim 1 further comprising a plurality of low conductance supports adapted to securely mount said absorbing tube network between said upper sheet and said lower sheet.

18. The invention of claim 1 wherein said cross manifold concentrating surface troughs are substantially perpendicular to said parallel linear concentrating surface troughs and wherein said cross manifold tube members are substantially perpendicular to said parallel longitudinal tube members.

19. The invention of claim 1 wherein said solar absorbing surface is a selective absorbing surface having high absorptance for solar radiation and low emitance for infrared radiation.

20. The invention of claim 1 wherein said envelope formed by said lower sheet sealed to said upper sheet will maintain a vacuum.

21. The invention of claim 1 wherein said mirrored coating is on the internal surface of said lower sheet.

22. An evacuated solar panel comprising;

a mirrored bottom glass sheet structured in a series of substantially parallel linear troughs, each of said troughs shaped as a concentrating surface and terminating at opposite ends in respective substantially perpendicular troughs, said perpendicular troughs shaped as concentrating surfaces;

a top glass sheet transparent to solar radiation sealed to said bottom sheet whereby to form a vacuum envelope;

absorbing tube network having a plurality of parallel longitudinal tube members terminating at opposite ends in respective transverse perpendicular manifold tubes, said tube network having a selective absorbing surface, and an entrance and an exit sealably extending through said vacuum envelope from respective perpendicular manifold tubes for passing a heatable fluid therethrough; and said parallel longitudinal members and transverse manifold tube members fixed intermediate said top sheet and said bottom sheet within said vacuum envelope for optimum solar concentration of said plurality of parallel linear troughs and perpendicular troughs, respectively.

* * * * *